(12) United States Patent
Zebolsky et al.

(10) Patent No.: US 6,357,956 B1
(45) Date of Patent: Mar. 19, 2002

(54) UNITIZED BOOT SEAL FOR BALL JOINTS

(75) Inventors: Michael L. Zebolsky, Marshall; Mark A. Davis, Portage, both of MI (US); David G. Moses, Decatur, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/458,039

(22) Filed: Dec. 10, 1999

(51) Int. Cl.⁷ ............................... F16C 11/06
(52) U.S. Cl. ................. 403/134; 277/635; 277/637
(58) Field of Search ................ 403/134, 122; 277/634, 635, 636, 637

(56) References Cited

U.S. PATENT DOCUMENTS

| | | |
|---|---|---|
| 949,966 A | 2/1910 | Bland |
| 2,197,037 A | 4/1940 | Gardner |
| 3,208,779 A | 9/1965 | Sullivan, Jr. |
| 3,290,073 A | 12/1966 | Gottschald |
| 3,292,957 A | 12/1966 | Ulderup |
| 3,343,855 A * | 9/1967 | Husen ............ 403/134 |
| 3,343,857 A | 9/1967 | Cislo |
| 3,357,728 A | 12/1967 | Melton et al. |
| 3,387,870 A | 6/1968 | Gottschald et al. |
| 3,476,417 A | 11/1969 | Born et al. |
| 4,154,546 A | 5/1979 | Merrick et al. |
| 4,220,418 A | 9/1980 | Kondo et al. |
| 4,650,362 A * | 3/1987 | Kubu ............ 403/134 |
| 4,856,795 A | 8/1989 | DeLano et al. |
| 5,028,163 A | 7/1991 | Krieg et al. |
| 5,092,704 A | 3/1992 | Buhl et al. |
| 5,312,200 A | 5/1994 | Buhl et al. |

FOREIGN PATENT DOCUMENTS

| | | |
|---|---|---|
| FR | 836608 | 1/1939 |
| FR | 1538231 | 1/1968 |
| GB | 1028126 | 5/1966 |
| WO | 0055514 | 9/2000 |

* cited by examiner

Primary Examiner—Lynne H. Browne
Assistant Examiner—John R. Cottingham
(74) Attorney, Agent, or Firm—Liniak, Berenato, Longacre & White

(57) ABSTRACT

A pivotal ball joint assembly includes a ball joint, an input/output member, and a sealing element to provide a sealing surface abutting the boot seal and to prevent contamination of the boot seal during movement and articulation of the input/output member relative to the ball joint. The ball joint has a socket body and a ball stud pivotally mounted to the socket body. The ball stud has a shank portion that extends therefrom and is aligned along a shank axis. An elastic boot seal that extends between the ball stud and socket body is also included. The pivotal ball joint assembly also includes an input/output member affixed to the ball stud shank portion so that the socket body is able to freely rotate relative to the input/output shaft about the shank axis. The pivotal ball joint assembly is further rotatable through a limited range about a transverse axis perpendicular to the shank axis. The seal element is interposed between the boot seal, the shank portion and the input/output member to enhance the boot seal interface and thereby guard the boot seal to shank portion interface against contamination during movement and articulation of the input/output member relative to the ball joint.

19 Claims, 4 Drawing Sheets

UNITIZED BOOT SEAL FOR BALL JOINTS

BACKGROUND OF THE INVENTION a) Field of the Invention

The present invention pertains generally to a ball joint for motor vehicles, and more particularly to a unitized boot seal formed of an elastically deformable material in which a metallic sealing element is provided adjacent the boot seal to shaft interface to prevent contamination of the sealed area.

b) Description of Related Art

Ball joints are commonly used as a pivotal coupling for allowing two members to angularly move with respect to each other. After a period of time, the ball joint may be subject to wear as a result of contact by one or both members. This is especially true if the ball joint is surrounded by a rubber boot seal that is continually abraded by a mating member during motion, thereby resulting in the aforementioned wear and the formation of an opening in the boot. When this wear occurs in the boot seal, contamination in the form of water, dust and road salt may enter the opening causing wear to the joint connection. Moreover, the interface between the boot and the ball joint members tends to become separated from the member(s) during prolonged use, and it is common for contamination to intrude upon the sealed area after such prolonged use.

One typical use for ball joints is in a front steering assembly of a motor vehicle, and specifically in the tie rod end joint. Tie rod end joint wear is a common warranty item for front steer axle assemblies. In operation, a tie rod cross tube has a ball joint assembly mounted at each end (i.e. the tie rod end joint) to which a side tie rod arm is coupled. This ball joint permits the steering knuckle, which is connected to a tie rod arm, to articulate with respect to the tie rod cross tube.

A boot seal often surrounds the ball joint, protecting it from wear as well as sealing the ball joint connection area from environmental factors and provide a means to retain ball joint lubrication fluid. Again, the aforementioned wear is a result of abrasion by the tie rod arm of the steering knuckle against the ball joint and boot seal during articulation. Moreover, the boot tends to separate from the ball joint shaft during use, and contamination enters the sealed area as a result of such separation.

Retaining rings and protective covers have been used to prevent unwanted separation of the boot from the shaft or damage to the boot element. However, these conventional devices do not effectively protect the boot seal from damage or divert contamination away from the boot to shaft interface.

Excluding contamination from the ball joint is important to increase lubrication intervals, to eliminate the need for re-lube, to extend the serviceable life of a tie rod end joint, and to improve the performance of the joint through reduced wear. Existing tie rod assembly designs do not adequately prevent contamination at the rotating boot to arm boss interface and the boot to ball stud.

The surface of the steering knuckle is forged or rough machined, and such rough machine surface finish provide an inadequate surface for the seal interface to seal against contamination entry into the tie rod end.

Consequently, there is a need for a secondary sealing element for the boot seal of the tie-rod end ball joint adjacent the boot seal to arm boss interface to provide an adequate sealing surface for the boot and to divert contamination from the primary boot to ball stud and arm seal location.

SUMMARY OF THE INVENTION

The present invention provides a boot seal surface interface for adequately sealing the ball joint and for diverting contamination from the primary boot to ball stud and arm seal location, and the present invention provides a boot seal element for use in a steering assembly of a motor vehicle for protecting the boot seal of a tie rod end ball joint from contamination during articulation of the steering knuckle.

It is a further object according to the present invention to provide a secondary sealing portion for the boot seal of the tie rod end ball joint that is both manufacturing friendly and cost effective.

And it is a still further object according to the present invention to provide a secondary sealing portion of the boot seal element that does not impede the angular movement or rotation of the ball joint. Dynamic sealing during normal tie rod rotation and oscillation occurs between the sealing element and the tie rod boot.

In carrying out the above objects, features and advantages, the present invention provides a pivotal ball joint assembly which includes, generally, a metallic sealing surface adjacent the boot and a secondary sealing surface to act as an excluder keeping contamination away from the primary sealing interface.

The sealing member, made of metal or the like, is pressed onto the tapered portion of the ball stud during assembly. Once assembled, there is no relative motion between the knuckle, tie rod ball stud, and the metallic sealing surface. A static sealing area may be provided between the metallic sealing member, ball stud, and knuckle. For example, an adhesive may be used, an o-ring may be located in a groove provided in the knuckle, or an o-ring may be provided within a groove in the metallic sealing member.

The secondary sealing arrangement provides a path for contamination to be diverted from the primary boot to ball stud and arm seal location. The formed seal provides a labyrinth that makes it difficult for contamination to reach the boot seal/ball stud interface.

The above objects and other objects, features and advantages of the present invention are readily apparent from the following detailed description of the best modes for carrying out the invention when taken in connection with the accompanying drawings wherein like reference numerals correspond to like components.

DETAILED DESCRIPTION OF PREFERRED EMBODIMENT

Figure 1:
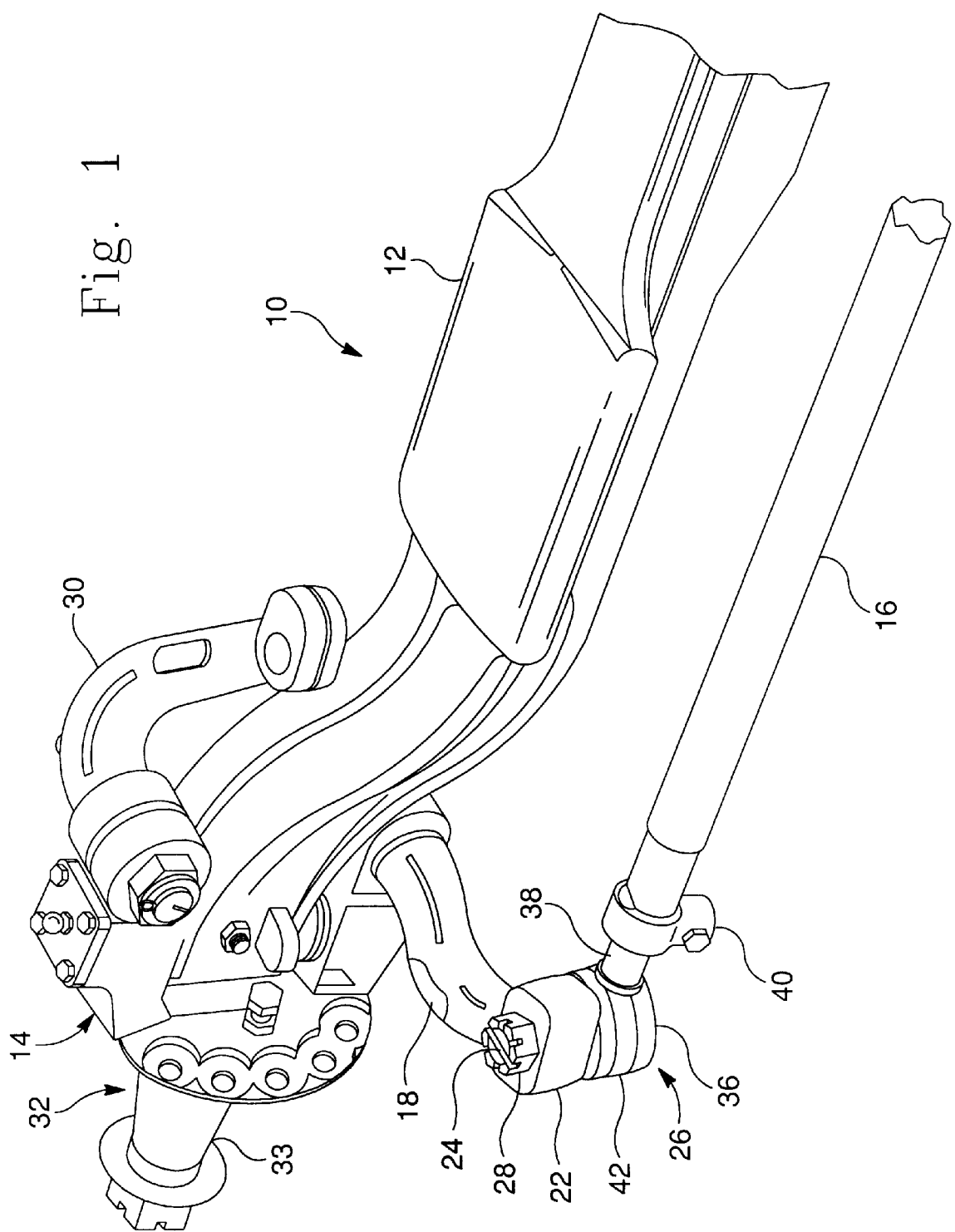
FIG. 1 is a partial perspective view of a front steering assembly, including the tie rod boot seal guard according to the present invention.

With reference to FIG. 1 of the drawings, shown is a partial perspective view of a typical front steering assembly 10 of a motor vehicle. Included in front steering assembly 10 are major components and sub-assemblies such as a steer axle beam 12, a steering knuckle 14, and a tie rod (or track rod) cross tube 16. Steer axle beam 12 is received by steering knuckle 14 and is coupled thereto. These components are also shown in FIG. 2.

Steering knuckle assembly 14 includes an input/output member 18 which is more commonly known as a tie rod arm (or Ackermann Arm). Tie rod arm 18 has a first end 20 which is coupled to steering knuckle assembly 14 and a second end 22 which is affixed to a ball stud 24 of a ball joint assembly 26, and mounted thereto by a nut 28. Of course, tie rod arm 18 may also be formed integral to steering knuckle assembly 14. More particularly, the second end 22 (boss end) of tie rod arm 18 is affixed to shank portion 25 of ball stud 24. Steering knuckle assembly 14 also includes steering arm 30 and spindle assembly 32. While the invention is shown incorporated into front steering assembly 10, it is readily contemplated that the uses of the pivotal joint assembly according to the present invention are limited only by need and imagination, and not by size, shape or complexity of design. Thus the teachings of this invention are equally suitable to any application including a ball joint assembly having a shank portion which is connected to a member moving relative thereto.

Again, for purposes of the present invention, it must be noted that tie rod arm 18 is coupled via ball joint assembly 26 to tie rod cross tube 16. Thus, ball joint assembly 26 allows steering knuckle assembly 14 to articulate and otherwise move with respect to tie rod cross tube 16. Tie rod cross tube 16 is transversely mounted and fitted at both ends with ball joint connecting sockets (discussed herein) and a socket body 36 (or socket housing) which embrace ball studs 24 retained by side tie rod arm 18 of steering knuckle assembly 14.

Figure 2:
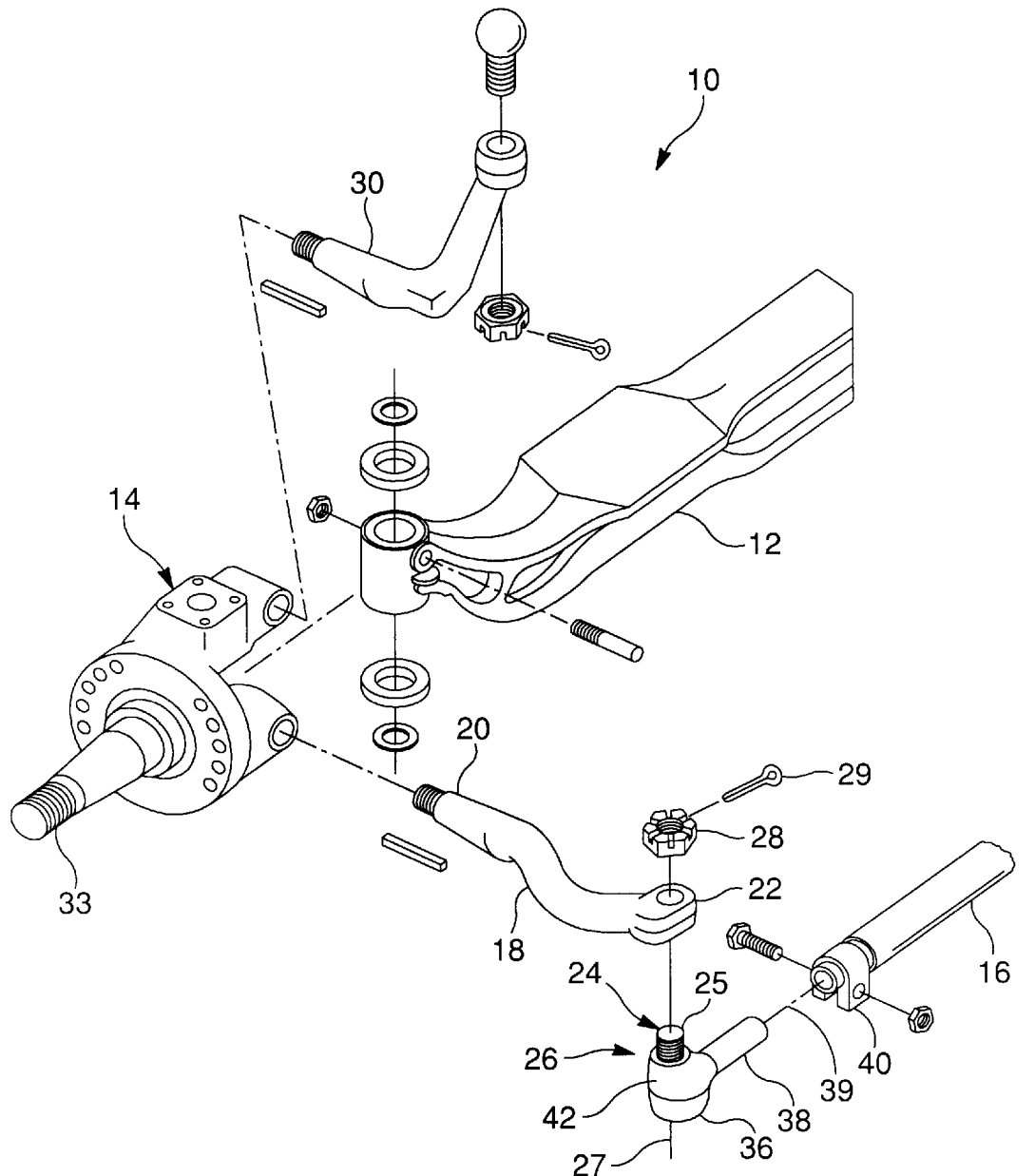
FIG. 2 is a partial perspective assembly view of a front steering assembly, including the tie rod boot seal guard according to the present invention.

Referring still to FIGS. 1 and 2, the boss end 22 of tie rod arm 18 is mounted to ball stud 24 of tie rod end ball joint assembly 26 via slotted nut 28 and cotter pin 29. Ball joint assembly 26 further includes a metal ball head portion 34 and socket 43 and 45 (best shown in FIG. 4), a socket body 36 and tie rod threaded stem 38 mounted to socket body 36. Thus, socket body 36 may freely rotate relative to input/output member 18 about shank axis 27 and further rotate through a limited range about a transverse stem axis 39 perpendicular to shank axis 27.

Figure 4:
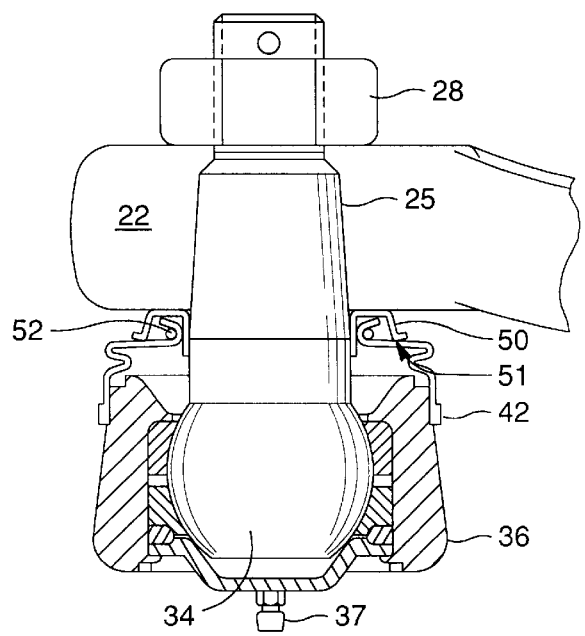
FIG. 4 is partial side sectional view of the tie rod ball joint including the tie rod boot seal guard according to the present invention.

As mentioned, tie rod threaded stem 38 includes a stem axis 39, which is perpendicular to shank axis 27 of ball stud shank 25. Further, as shown in FIG. 4 a pair of bearing seats (i.e. the socket), upper bearing seat 43 and lower bearing seat 45 are disposed in socket body 36. Upper bearing seat 43 is commonly formed of hardened steel, while lower bearing seat 45 is formed of a hard thermoplastic material which is molded around ball head portion 34. However, bearing seats 43 and 45 may both be formed either plastic or metal. It is also acknowledged that there are other methods, known in the art, of retaining ball head portion 34 within socket body 36.

Tie rod shank 38 is coupled to tie rod cross tube 16 via tie rod clamp 40 or other coupling. FIG. 2 illustrates one method of assembling front steering assembly 10 for use in a vehicle. In FIG. 2, axle beam 12 is connected at each distal end to wheel spindle assemblies 32 by means of steering knuckle assemblies 14 thereby providing pivot points for pivotably supporting spindle assemblies 32. Each wheel (not shown) is supported on a wheel spindle 33 to permit the front wheels to swing to one side or the other, around kingpin assembly 14. However, it is well known in the art that there are various methods, components, and combinations of components that may be used to connect or pivotably support the pair of transversely spaced steerable right and left wheel spindles 33 relative to steer axle beam 12. As such, this connection and support will not be discussed further herein. While it is also well-known in the art, it should be noted that the left-side front steering assembly components and sub-assemblies illustrated in the drawings herein have corresponding right-side counterparts that are oriented generally symmetrical about a center line (not shown) of steer axle beam 12 or tie rod cross tube 16.

Further shown in FIG. 2, ball joint assembly 26 further includes a boot seal 42 for protecting ball joint assembly 26 from environmental contamination wear. Such environmental contamination may result from water, dirt, gravel and other contamination which may interfere with connection between the socket and ball head portion 34. Boot seal 42 further contains a viscous oil, grease or other lubricant for lubricating ball joint assembly 26. This lubricant is pumped into boot seal 42 and socket body 36 through zerk 37 or grease fitting (best shown in FIG. 4). Specifically, boot seal 42 seals and encloses the opening where ball stud is contained within socket body 36. Boot seal 42 has an upper surface 44 having sufficient clearance so that boot seal 42 does hinder or impede the angular movement or rotation of ball stud 24. Boot seal 42 extends in an axially downward fashion between shank portion 25 and socket body 36, and is sealed against shank 25 at one end so that shank 25 projects through upper surface 44 of boot seal 42. The other end of boot seal 42 (opposite upper surface 44) is sealed against socket body 36. As socket body 36 is typically wider then shank 25, boot seal 42 is correspondingly wider at the portion proximate socket body 36, boot seal 42 being frustoconical in nature. Boot seal 42 is formed from an elastic material and preferably a rubber or urethane material having properties that are acceptable for the particular application.

Figure 3:
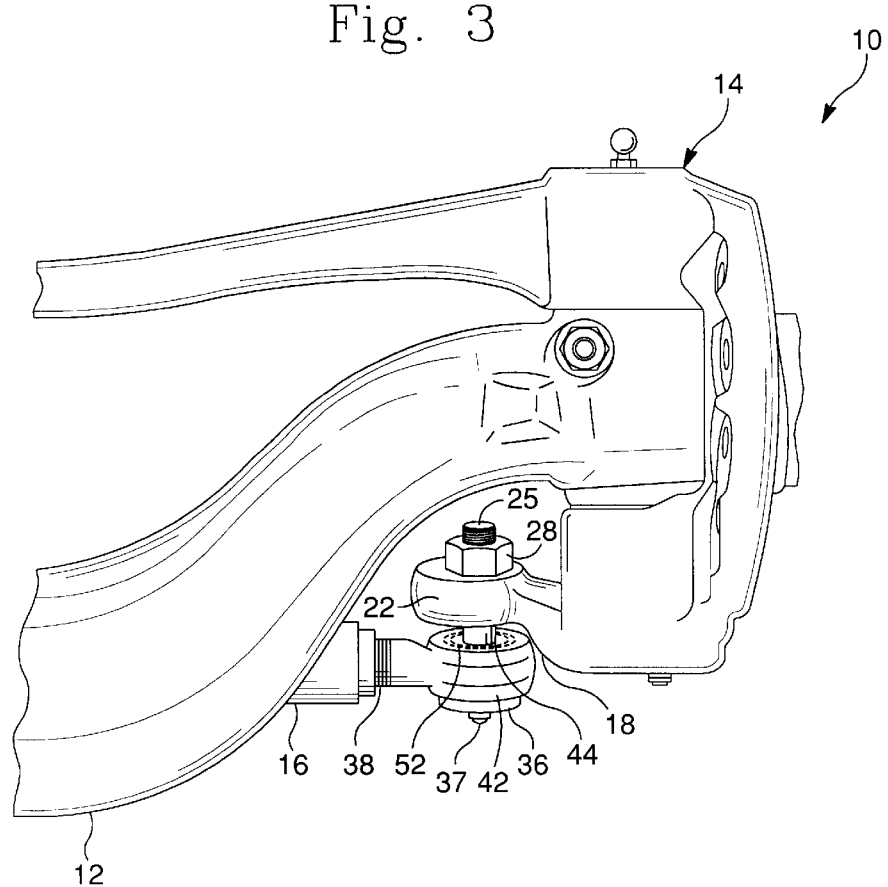
FIG. 3 is a partial front view of a front steering assembly including the tie rod boot and secondary sealing element according to the present invention.

Referring now to FIGS. 2 and 3, a seal element 50 is interposed between tie rod arm end 22 and upper surface 44 of boot seal 42. Boot seal element 50, according to the present invention, serves to provide smooth and effective sealing surfaces for the boot seal 42, and to protect the boot seal 42 from contamination due to separation of the boot seal 42 from the shank 25, and to protect boot seal 42 from abrasion and rubbing as a result of tie rod arm 18 articulation with respect to ball joint assembly 26 and tie rod cross tube 16. Moreover, the present invention envisions a secondary sealing surface and interface shown generally at reference numeral 51. Again, this secondary sealing surface and interface will prevent a contamination path from being formed in boot seal 42 due to the abrasion and creates a labyrinth path for moisture and contamination from reaching the interface of the boot seal 42 and the shank 25.

FIG. 3 is a partial front view of a front steering assembly 10 including seal element 50 assembled according to the present invention. Sealing element 50 is preferably formed of stainless steel or other metallic material or any material that provides a smooth and effective sealing surface for the boot 42. This need arises because the knuckle surface or boss surface that interfaces with the conventional boot is cast or rough machined. Such a rough surface provides an inadequate sealing surface and causes premature wear of the boot seal and tie rod end.

In the preferred design, the sealing element 50 is snugly pressed onto the shank 25. With focus on FIG. 4, shown therein is a partial side sectional view of a ball joint assembly 26 including the seal element 50 according to the present invention. The seal element 50 provides enhanced sealing surfaces around the boot and element 50 provides a secondary sealing surface 51 offset from the shank 25. A spring ring or pinch ring 52 may be disposed around the tie rod boot 42 around its top surface 44 to retain the boot 42 at the seal element 50.

The sealing member 50, made of metal or the like, is pressed onto the tapered portion of the ball stud 25 during assembly. Once assembled, there is no relative motion between the knuckle, tie rod ball stud, and the metallic sealing surface. A static sealing area may be provided between the metallic sealing member, ball stud, and knuckle. For example, an adhesive may be disposed between the sealing member 50, the ball stud 25 and the knuckle boss 22.

Figure 5A:
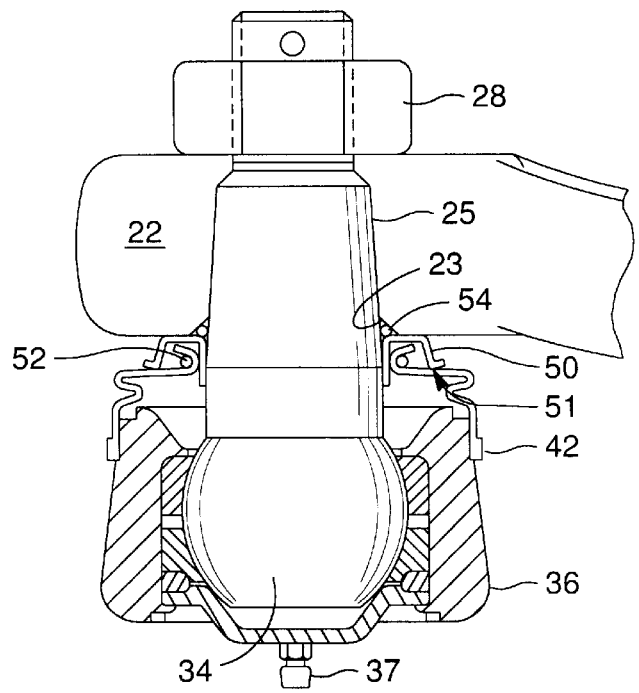
FIGS. 5a and 5b are partial side sectional views showing the tie rod arm seal according to two different alternate embodiments, respectively.
Figure 5B:
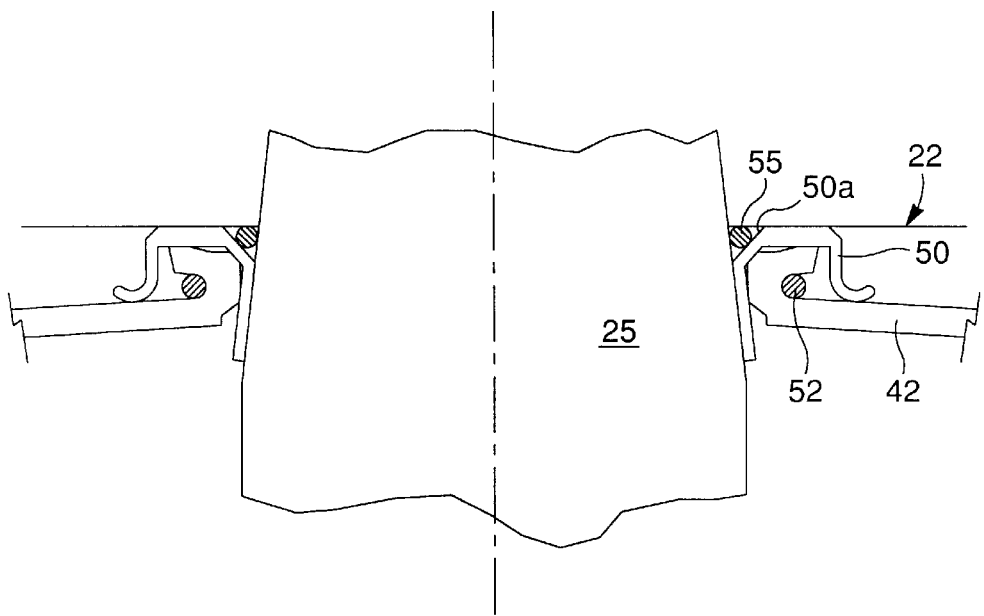

In an alternate embodiment, the adhesive of FIG. 4 is replaced by or supplemented with an o-ring 54 located in a groove 23 provided in the knuckle 22 as shown in FIG. 5a. Likewise, the adhesive of FIG. 4 may be replaced or supplemented with or an o-ring 55 located within a groove 50a provided in the metallic sealing member 50.

The secondary sealing surface 51 provides a path for contamination to be diverted from the primary boot to ball stud and arm seal location. The formed seal provides a labyrinth that makes it difficult for contamination to reach the boot seal/ball stud interface.

It is understood, of course, that while the forms of the invention herein shown and described include the best mode contemplated for carrying out the present invention, they are not intended to illustrate all possible forms thereof. It should also be understood that the words used are descriptive rather than limiting, and that various changes may be made without departing from the spirit or scope of the invention as claimed below. For example, the term "adhesive" has been used to describe the manner of affixing the seal ring 50 to either the boot seal 42 or the tie rod arm 18; however, any suitable affixation means may be employed to provide this sealing connection.

What is claimed is:

1. A pivotal joint assembly comprising:
   a ball stud previously mounted to a socket body, the ball stud having a shank portion extending therefrom defining a shank axis;
   an input/output member affixed to the ball stud shank portion wherein the socket body is freely rotatable relative to the input/output member about the shank axis and rotatable through a limited range about a transverse axis perpendicular to the shank axis;
   a boot sleeve of resilient material surrounding said shank portion, said boot sleeve having a first end adjacent said input/output member and a second end adjacent said socket body;
   a sealing element pressed onto said shank portion and interposed between said input/output member, said boot sleeve and said shank portion, and
   a sealing member disposed at an interface of said seal element, said shank portion and said input/output member;
   wherein said sealing element defines a primary seal interface at said first end of said boot sleeve adjacent said shank portion and secondary seal interface at an intermediate portion of said boot sleeve remote from said first end.

2. The pivotal joint assembly according to claim 1, further comprising a clearance bounded by said boot sleeve and said sealing element.

3. The pivotal joint assembly according to claim 1, wherein said sealing element circumscribes said shank portion.

4. The pivotal joint assembly according to claim 1, wherein said secondary seal interface isolates said first end of said boot sleeve from exposure to contamination.

5. The pivotal joint assembly according to claim 1, further comprising a boot retaining ring element circumscribing said first end of said boot sleeve, said sealing element and said shank portion.

6. The pivot joint assembly according to claim 5, wherein said secondary seal interface is disposed radially outside said boot retaining ring element.

7. The pivot joint assembly according to claim 1, wherein said sealing member is an o-ring member disposed at an interface of said seal element, said shank portion and said input/output member.

8. The pivotal joint assembly according to claim 7, wherein said o-ring is disposed within a groove provided in one of said input/output member and said seal element.

9. The pivotal joint assembly a ccording to claim 1, wherein said sealing member is an adhesive disposed at an interface of said seal element said shank portion and said input/output member.

10. A pivot joint assembly comprising:
    a ball stud pivotally mounted to a socket body, the ball stud having a shank portion extending therefrom defining a shank axis;
    an input/output member affixed to the ball stud shank portion wherein the socket body is freely rotatable relative to the input/output member about the shank axis and rotatable through a limited range about a transverse axis perpendicular to the shank axis;
    a boot sleeve of resilient material surrounding said shank portion, said boot sleeve having a first end adjacent said input/output member and a second end adjacent said socket body; and
    a sealing element pressed onto said shank portion and interposed between said input/output member, said boot sleeve and said shank portion, and
    an o-ring member disposed at an interface of said seal element, said shank portion said input/output member.

11. The pivotal joint assembly according to claim 10, wherein said o-ring is disposed within a groove provided in one of said input/output member and said seal element.

12. The pivotal joint assembly according to claim 10, wherein said sealing element defines a primary seal interface at said first end of said boot sleeve adjacent said shank portion and secondary seal interface at an intermediate portion of said boot sleeve remote from said first end.

13. The pivotal joint assembly according to claim 10, further comprising a clearance bounded by said boot sleeve and said sealing element to thereby isolate said first end of said boot sleeve from exposure to contamination.

14. The pivotal joint assembly according to claim 10, wherein said sealing element circumscribes said shank portion.

15. The pivotal joint assembly according to claim 10, further comprising a boot retaining ring element circumscribing said first end of said boot sleeve, said sealing element and said shank portion.

16. The pivotal joint assembly according to claim 12, wherein said secondary seal interface is disposed radially outside said boot retaining ring element.

17. The pivotal joint assembly according to claim 10, further comprising adhesive disposed between said seal element and at least one of said shank portion and said input/output member.

18. A method of assembling a pivot joint assembly comprising the steps of:

provonding a ball stud previously mounted to a socket body, the ball stud having a shank portion extending therefrom defining a shank axis;

disposing a boot sleeve of resilient material around said shank, said boot sleeve having a first end circumscribing said socket body and a second end circumscribing said shank portion thereby forming a primary sealing element;

press fitting a metallic sealing element onto said shank portion, said metallic sealing element engaging said boot sleeve at a first sealing interface adjacent said first end and at a second sealing interface at an intermediate portion of said boot sleeve intermediate of said first and second ends;

mounting said input/output member onto the ball stud shank portion such that said metallic sealing element engages both said input/output member and said boot sleeve, disposing of a sealing member at an interface of said metallic seal element, said shank portion and said input/output member, wherein said first sealing interface diverts contamination away from said first sealing interface.

19. The method of claim 18, wherein said step of press fitting said metallic sealing element creates a clearance bounded by said boot sleeve and said sealing element.

* * * * *